United States Patent Office 3,294,616
Patented Dec. 27, 1966

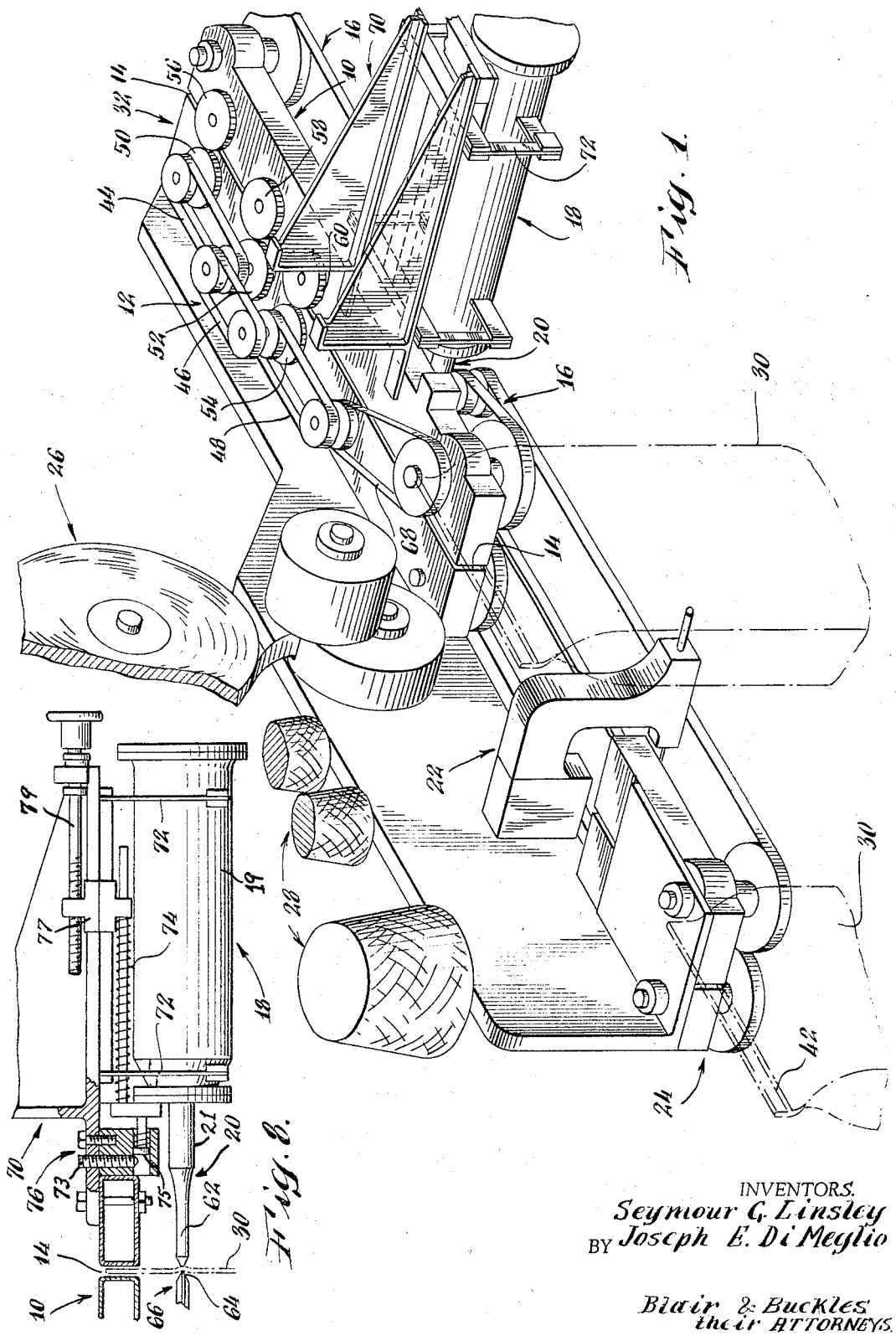

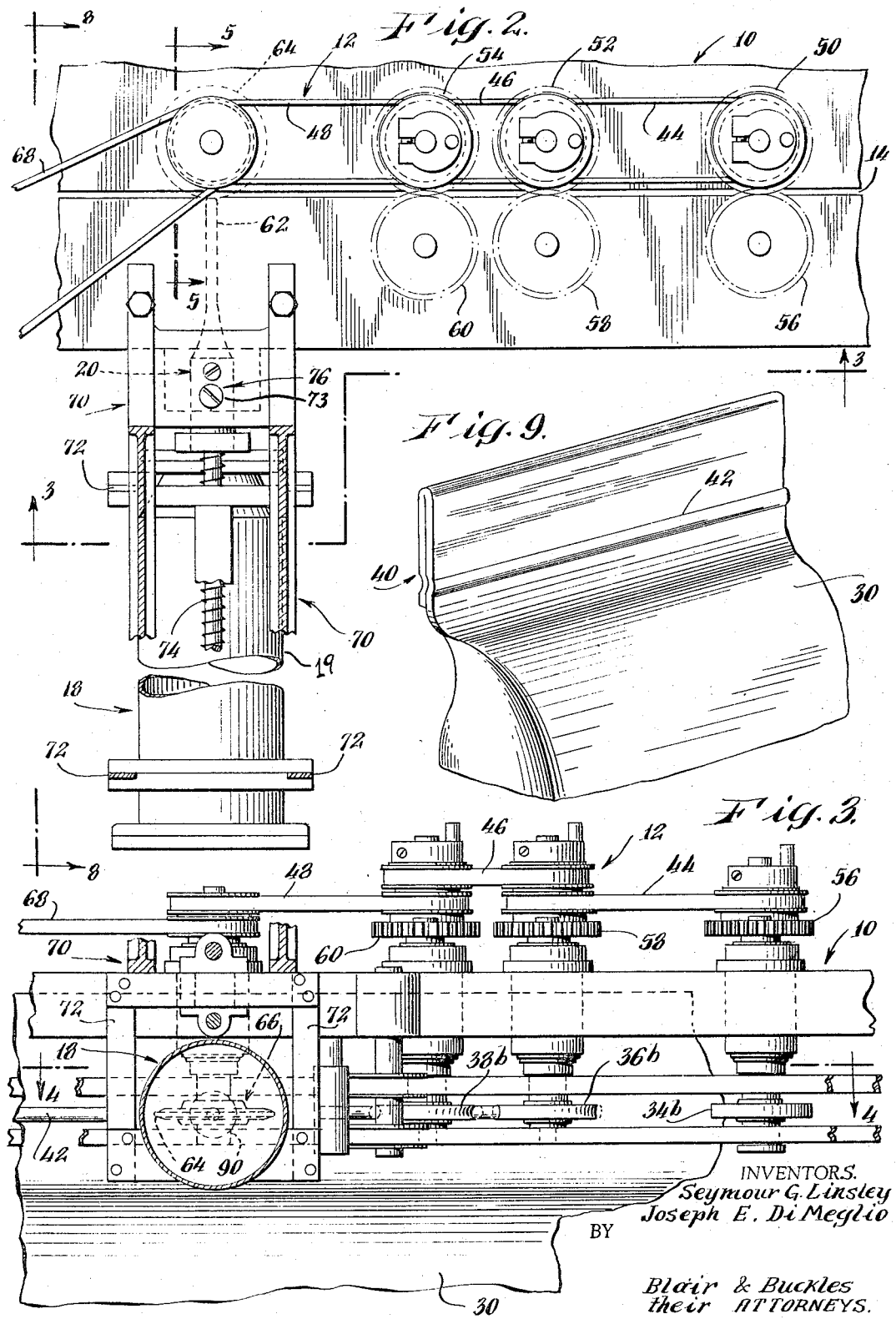

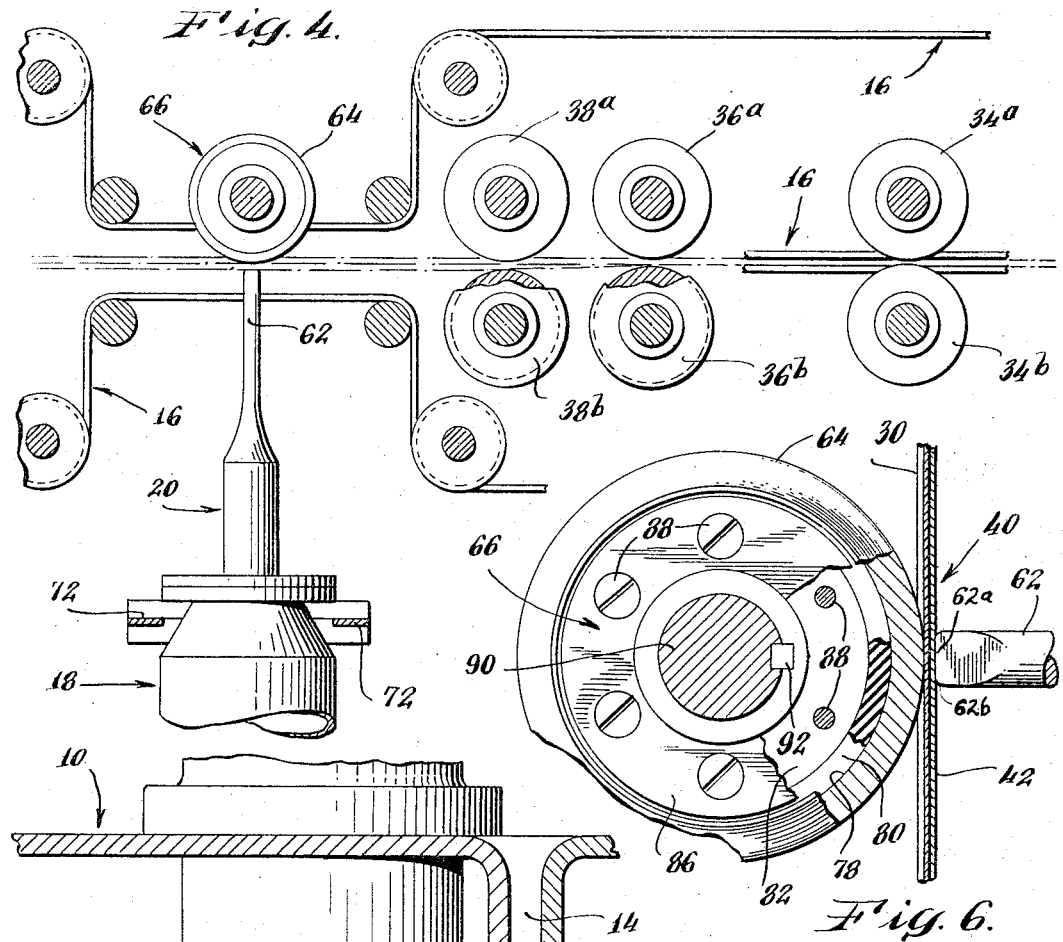
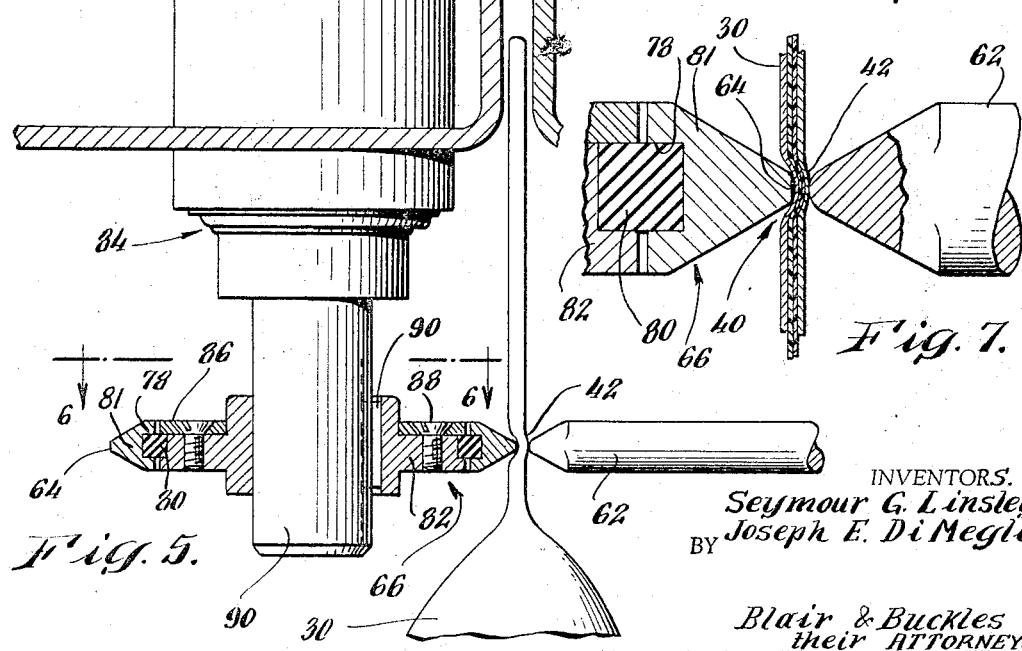

3,294,616
APPARATUS FOR SEALING POLYMERIC SHEET
MATERIAL BY ULTRASONIC ENERGY
Seymour G. Linsley, Bridgeport, Conn., and Joseph E.
Di Meglio, Providence, R.I., assignors, by direct and
mesne assignments, to Branson Instruments, Inc., Stamford, Conn., a corporation of Delaware
Filed Oct. 3, 1963, Ser. No. 313,528
7 Claims. (Cl. 156—580)

This invention relates to methods and apparatus for sealing material together and more particularly to the sealing of sheet material such as polymers by ultrasonic energy.

The term "ultrasonic" generally refers to sound having a frequency above the range of human hearing. It should be understood, however, that the term "ultrasonic" as used in the specification and claims herein also encompasses sound energy within the range of human hearing.

Prior art sealing of a variety of polymeric sheet materials has been largely accomplished by the application of heat to fuse the sheet material together in effecting a seal. The heat source for such sealing has been generally a rod or plate having an electrical heating element for transmitting heat to the sheet material to be sealed. Thus for a number of applications, prior art heat sealing methods and apparatus were satisfactory but subject to certain limitations.

A principal limitation is that it is difficult or impractical to transmit heat through a layer or layers of material surrounding the polymeric sheet. Examples of such sealing problems would be in the sealing of a bag liner through the paper wall of the bag. Another typical example is the sealing of sheet material which may be coated with a film of polymeric material wherein the coated faces of the material are to be sealed one to another. In such a case heat energy must be transmitted through the primary sheet material in order to heat seal the polymeric film on the inner faces thereof.

In the application of ultrasonic energy for such sealing the seals obtained have generally been poor or permit only an uneconomically low rate of sealing. Problems in sheet sealing are exemplified by prior art attempts to obtain a satisfactory seal at the inner liner of a multi-wall bag when ultrasonic energy is applied through the outer layers of paper. For example, the opposed walls of the bag liner would be properly sealed together at some points or areas, but not across the whole bag top.

We have discovered that acoustical isolation of the anvil opposing the transducer results in not only a stronger, more uniform seal but also in a faster rate of sealing sheet material such as polyethylene bag liners through the outer bag plies. It has also been found that air gaps are formed between the bag plies when there is wrinkling or gathering of one or more of the plies or layers. Thus wrinkling prevents the proper transfer of energy through the liner, and because the operation of the transducer is also affected by the pressure at which it is urged against the material to be sealed, it is not possible to eliminate the pockets and the effect of the wrinkling by merely increasing the pressure applied to the transducer tip.

It has been found that the undesired gaps or gas pockets may be substantially reduced by firmly pressing the plies of the bag together immediately in advance of the transducer and anvil but such pressing alone does not eliminate all the wrinkling. In some cases the wrinkles are merely moved near one edge of the bag and in some cases the wrinkles are flattened without eliminating their undesirable effect. The wrinkles may be substantially eliminated along the top of the bag by stretching the bag top while pressing the plies together.

Further problems have also been present in prior art methods and apparatus wherein a continuous sealing operation must be formed in order to make the practice economically feasible.

Accordingly, it is an object of the present invention to provide methods for sealing sheet material by the application of ultrasonic energy.

Another object of the invention is to provide methods of the above character for sealing polymeric sheet material.

A further object of the invention is to provide methods of the above character wherein the ultrasonic energy must be applied through one and more layers of other sheet material.

A further object of the invention is to provide methods of the above character wherein the sealing operation can be performed in a continuous manner.

A further object of the invention is to provide apparatus for carrying out the above methods.

Another object of the invention is to provide methods and apparatus of the above character which are economical and safe in manufacture and operation.

Other objects of the invention will in part be obvious and will in part appear hereinafter.

This invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a perspective schematic view of a machine for sealing polymeric bag liners by ultrasonic energy.

FIGURE 2 is a partial top view of the bag transport and conditioning means and the ultrasonic sealing means.

FIGURE 3 is a side view in partial section taken along lines 3—3 of FIGURE 2 and looking in the direction of the arrows.

FIGURE 4 is a top sectional view taken along lines 4—4 of FIGURE 3 and looking in the direction of the arrows.

FIGURE 5 is a partial sectional view taken along lines 5—5 of FIGURE 2 and looking in the direction of the arrows.

FIGURE 6 is a partial top view in partial section of the acoustically isolated anvil and opposed transduced tip.

FIGURE 7 is an enlarged partial sectional view of the anvil periphery and ultrasonic transducer emitting tip.

FIGURE 8 is a partial side sectional view of the transducer assembly mounting taken along lines 8—8 of FIGURE 2.

FIGURE 9 is a partial perspective view of a polymeric lined bag which has been conditioned for ultrasonic sealing.

Referring now to FIGURE 1, the illustrative apparatus and method for sealing bag liners will be described. In general the embodiment of the machine shown comprises a support structure 10 supporting a number of synchronized and interconnected drives 12 for conditioning the bag tops and for transporting the bags through the machine with the bag tops passing through slot 14. Belts 16 may also be used in the machine for transporting the bags through the conditioning and sealing steps. An ultrasonic transducer assembly 18 is positioned on the support structure 10 with its ultrasonic horn 20 positioned to contact the bag tops as they pass through the machine.

Bag sewing apparatus 22 is positioned near the exit end 24 of the machine for stitching the bag tops together after ultrasonic sealing of the bag lining. Before such final sealing a tape from supply reel 26 is positioned over the bag top and is stitched thereto with heavy thread supplied from spools 28.

In operation, the multi-walled bags 30 are moved by a conveyor (not shown) into slot 14 at the entrance end 32 of the machine. The bags are then moved through the machine by the conveyor and by a number of friction belts such as 16. Wrinkles and air gaps are removed from the bag walls and liner by slightly stretching the upper portion of the bag with pinch rollers. The upper portion of the bag is subjected to ultrasonic energy under controlled pressure along the stretched, conditioned sealing line across the top of the bag. Opposing the emitting end of the transducer is a driven rotary anvil which is acoustically isolated from the remainder of the machine as will be more fully described hereinafter. After sealing of the bag liner, which may be a thin polyethylene sheet or film, the bags are further moved through the machine for stitching of the upper part of the bag. Thus the bag lining of polymeric material is effectively conditioned and sealed through one or more layers of paper which surround the lining.

Referring now to FIGURES 2–4, the invention will be described in more detail. The bag top after entering slot 14 is conditioned for sealing by synchronously driven pinch rollers 34a and b, 36a and b, and 38a and b. These pinch rollers, along with the conveyor and friction belts mentioned above, are also part of the bag transport means for moving the bags through the machine. The pinch rollers 34a and b have a generally straight-sided periphery, but rollers 36a and 38a have a convex, rounded periphery, while opposing rollers 36b and 38b have a concave periphery which interfits with the convex periphery of rollers 36a and 38a. As shown in FIGURE 9, the bag top 40 is thus crimped or grooved along the sealing line 42 by these concave-convex pinch rollers prior to the application of ultrasonic energy. The crimped sealing line 42 has been exaggerated in FIGURE 9 for illustrative purposes.

Still referring to FIGURES 2–4, it will be seen that the pinch rollers 34a, 36a, and 38a are driven by synchronous belts 44, 46, and 48 respectively which also drive gears 50, 52, and 54 respectively which are in mesh with gears 56, 58, and 60 respectively to synchronously drive opposing pinch rollers 34b, 36b, and 38b. Pinch rollers 36a, b, and 38a, b are preferably of an increasingly larger diameter than the preceding pinch rollers to slightly stretch the bag top along the sealing line as part of the presealing conditioning. The rollers 38a and b are also more closely interfitted than rollers 36a, b to increase the crimping action. Thus, the bag top is stretched along the seal line and is also stretched across the seal line by the concave-convex pinch rollers prior to ultrasonic sealing.

In one embodiment of the apparatus of the invention the roller dimensions and displacement were as follows:

| Roller | Diameter, in. | Thickness, in. | Periphery Curvature | Displacement Approx. |
| --- | --- | --- | --- | --- |
| 34a | 3.231 | ⅜ | None | None. |
| 34b | 3.231 | ⅜ | do | None. |
| 36a | 3.273 | ⅜ | ⅜ in. rad | .075. |
| 36b | 3.273 | ⅜ | ⅜ in. rad | .075. |
| 38a | 3.281 | ⅜ | ⅜ in. rad | .150. |
| 38b | 3.281 | ⅜ | ⅜ in. rad | .150. |

The bag is moved from the pinch rollers and then passes between the emitting tip 62 of transducer horn 20 and the periphery 64 of the driven rotary anvil 66. The anvil 66 is rotatably driven by synchronous belt 68 which also drives belts 48, 46, and 44 to rotate the pinch rollers.

As shown in FIGURES 2 and 8, the transducer assembly 18 is suspended from a bracket 70 by relatively broad, flat leaf springs 72 which permit movement of the transducer horn 20 toward or away from the anvil 66 but which prevent movement in any other direction. A variable spring 74 urges the transducer assembly 18 toward the anvil and against an adjustable limiting stop assembly 76 so that pressure exerted by transducer tip 62 is controlled by the tension of spring 74, and the minimum gap width between transducer tip 62 and the anvil periphery 64 is adjusted by varying the setting of stop assembly 76.

As shown in FIGURES 2 and 8, the apparatus for supplying the sound energy to produce the seal may comprise an electrically energized converter in housing 19 which is connected to the tip 62 at the end of exponential horn 20 through a half-wave extension 21 which may be suspended from the housing 19 at a nodal point. An ultrasonic generator (not shown) operating at a nominal frequency of approximately 20,000 cycles per second and a power output of 150 watts is connected to the converter which comprises a piezoelectric element coupled to the mechanical transformer 20, 21.

In operation, the spacing between the end of the tip 62 and the periphery 64 of the anvil 66 is about one-half the thickness of the conditioned portion of the bag. When the conditioned portion 42 of the bag 30 (FIGURE 9) enters between the tip 62 and the anvil 66, either the tip or the anvil must move slightly in a direction substantially perpendicular to the path of movement of the bag therebetween. In the embodiment shown the tip 62 moves and during such movement, there should be substantially no vertical movement of the tip in order to avoid variation of the sealing pattern, which is relatively narrow, and to avoid changing the angle of the tip with respect to the portion of the bag being sealed. When the forward edge of the bag enters into the space between the tip 62 and the anvil, there should also be no movement of the tip 62 in the direction of movement of the bag.

The pressure which the tip 62 applies to the bag is determined by the type of material and the power and frequency of the ultrasonic energy applied. The pressure exerted through the transducer tip 62 should compress the bag layers to about one-half of their normal thickness along the seal line. It has been found that compression of from 30 to 70% of the normal layer thickness is possible for a wide range of sheet material with satisfactory sealing results. For most applications, however, compression to one-half the normal thickness is sufficient. The pressure applied by the tip should not vary to any substantial extent when the tip moves longitudinally thereof because of the entry of a bag between the tip and the anvil or because of bag thickness variations. A suspension for the transducer housing 18 as shown in FIGURES 2 and 8 meets all of the foregoing requirements. As shown in FIGURES 2 and 8, the transducer housing is suspended from the fixed frame 10 of the machine by means of four sets of flexible leaf springs 72 attached to bracket 70. Each of the sets of springs 72 may comprise four leaf springs, two of which may be made of spring steel .023" thick, ¾" wide and approximately 6" long, whereas the other two leaf springs may be of the same dimensions, but of spring steel .020" thick. Such a leaf spring suspension permits relative freedom of movement in the direction longitudinally of the transducer horn 20 but prevents displacement of the horn in the direction of movement of the bag. In addition, the leaf springs 72 permit mounting of the housing 19 at a radius with respect to the frame 10 which eliminates substantial movement of the tip 62 in the vertical direction, with the small amount of tip movement being transverse to the path of movement of the bag due to the entry of the bag between the tip and the anvil.

As shown in FIGURE 8, forward movement of the tip, that is, movement toward the conditioned portion of the bag and hence the spacing between the tip 62 and the anvil 66, may be limited by an adjustable stop assembly 76. Stop assembly 76 comprises an adjusting screw 73 having a tapered end engaging a slide rod 75 which is attached to the transducer housing 19. The transducer assembly is urged toward the anvil 66 by a spring 74, the tension of which is adjustable by moving stop block 77 along the threaded, rotatable rod 79.

Referring now to FIGURES 5–7, it will be seen that the anvil 66 comprises an outer ring 81 having an annular groove 78 which receives a joining ring 80 of material having low sound transmissivity properties. The joining ring 80 secures the outer ring 81 and spaces it from hub portion 82 to acoustically isolate the ring 81 from the remainder of the anvil and its rotatable mounting assembly 84. The joining ring is secured to the anvil hub portion by an annular plate 86 which is fastened to the hub portion by screws 88. The anvil hub portion is secured to the shaft 90 by a key arrangement 92 for rotation therewith. The anvil ring 81 serves as a heat sink and as a rotatable pressure plate for the maintenance of a substantially constant pressure on the material being sealed. It has been found that the material of the outer anvil ring 81 should be a hard metal having good sound and heat transmissivity. The joining ring 80 is preferably made of an elastomer such as rubber or like material having low sound transmissivity properties whereby the outer ring 81 is acoustically isolated from the remainder of the anvil assembly. Acoustical isolation of the anvil outer ring not only prevents dissipation of ultrasonic energy through the anvil but also prevents disruptive vibrations from being transmitted through the anvil assembly to the outer ring 81 of the anvil. Such disruptive vibrations, if transmitted to the material being sealed, may have a deleterious effect on seal effectiveness and/or the rate of sealing.

With the transducer operating at about twenty kilocycles per second, one successful embodiment of the anvil 66 had the following dimensions for the outer ring 81 (Material—303 stainless steel):

| | |
|---|---|
| Outside Diam., in. | 3.331 |
| Inside Diam., in. | 2.593 |
| Maximum Thickness, in. | .375 |
| Peripheral Face Width, in. | 1/16 |
| Peripheral Taper, deg. | 30 |
| Groove Depth, in. | .078 |
| Groove Width, in. | .192–.197 |

Thickness and width were measured in the axial direction. The dimensions of the hub 82 were as follows:

| | In. |
|---|---|
| Outside Diam. | 2.53 |
| Groove Diam. | 2.37 |
| Groove Width | .175 |
| Hub Diam. | 17/16 |
| Hub Bore | 1.0 |
| Flange Thickness | .268 |

The unstressed dimensions of the joining ring 80 were as follows (durometer hardness 55):

| | In. |
|---|---|
| Outside Diam. | 2.75 |
| Inside Diam. | 2.375 |
| Thickness | .212 |

The characteristics of the material of the joining ring 80 may be varied within certain limits, but in particular the ring 80 must not be too soft for the pressures of the transducer tip, since the outer ring 81 should be substantially maintained in its position opposing the transducer tip. A too soft rubber joining ring 80 tends to compress excessively or to permit some vertical displacement of the outer ring 81 which may result in an ineffective seal. If the joining member 80 is too hard, the outer ring 81 may not be acoustically isolated from the anvil hub. Further, the presentation of a relatively small annular surface 64 on the edge of the anvil is believed to aid in concentrating the ultrasonic energy through the seal line 42, and therefore a tapered outer ring 81 is preferred.

As shown in FIGURE 6, the transducer tip 62 has a flattened end 62a with slightly rounded corners 62b when viewed from the top. The flattened end 62a presents a slightly elongated pattern of ultrasonic energy to the anvil rim 64. As shown in FIGURE 7, the transducer tip is tapered when viewed from the side to concentrate ultrasonic energy along a relatively narrow sealing line.

It should be remembered that the removal of wrinkles or air gaps from the sheet material to be sealed is essential to prevent reflection of ultrasonic energy from layer surfaces. It is equally important that good, continuous contact between the material layers and the transducer tip and anvil be maintained at all times to provide maximum coupling of ultrasonic energy to and through the layer material. The pressure exerted by the transducer tip thus provides the coupling and maintains the layers in a compressed condition during sealing.

Although the embodiment shown and described herein is directed toward the sealing of liners for multi-wall bags, the invention is applicable to sealing a number of materials which are sealable by sound energy. In the case of multi-wall paper bags having a polymeric lining, the paper walls of the bag act as a coupling medium between the transducer tip and the anvil rim. Thus, a number of materials can be substituted for the paper walls of the bag and/or the polymeric sheet material of the bag liner such as thin fibrous sheet material having a film of polymeric material thereon. If no air gaps are present, it may be unnecessary or undesirable to stretch the sheet material prior to the application of ultrasonic energy under compression. In such applications the acoustic isolation of the anvil outer ring should be maintained to result in a more effective seal at a greater rate of material movement between the transducer tip and anvil.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. Apparatus for sealing polymeric sheet material comprising
   (A) Sheet material transport means for positioning layers of sheet material together for sealing as said sheet material is moved,
   (B) means for compressing said layers of sheet material together,
   (C) an ultrasonic transducer horn
       (1) having an emitting end aligned with said compressing means,
   (D) means for generating and transmitting ultrasonic energy to said ultrasonic transducer horn,
   (E) an acoustically isolated anvil adjacent said emitting end of said transducer horn, and
   (F) means rotatably supporting said anvil,
       (1) said anvil being rotatable with its periphery maintaining a position opposing said emitting end of said transducer horn.

2. The apparatus defined in claim 1 wherein said anvil is provided with a hub portion, a peripheral portion and a joining portion having low sound transmissivity.

3. Ultrasonic sealing apparatus comprising, in combination,
   (A) an ultrasonic transducer (1) having a reduced emitting end for concentrating ultrasonic energy through a relatively small area,
(B) an annular anvil having its periphery closely opposing said emitting end of said transducer, said anvil comprising
   (1) a peripheral portion,
   (2) a hub portion and
   (3) a joining member secured between said peripheral portion and said hub portion,
      (a) said joining member being made of a material having low sound transmissivity at the frequency of said transducer to acoustically isolate said peripheral portion from said hub portion,
(C) means for rotatably supporting said hub portion,
(D) means for transmitting ultrasonic energy to said transducer, and
(E) means for moving opposed layers of polymeric sheet material between said emitting end of said transducer and said peripheral portion of said anvil,
whereby layers of sheet material are pressed between said emitting end of said transducer and the periphery of said anvil and are sealed by ultrasonic energy as the layers are passed therebetween.

4. The apparatus defined in claim 3 wherein there is provided means for rotatably driving said anvil.

5. An anvil for an ultrasonic transducer comprising, in combination,
(A) an annular peripheral portion,
   (1) having high sound transmissivity characteristics at the transducer frequency,
(B) an annular hub portion,
(C) an annular joining member secured to and joining said peripheral portion to said hub portion,
   (1) said joining member being made of a material having low sound transmissivity characteristics at the transducer frequency, and
(D) means for rotatably supporting said anvil whereby said peripheral portion is acoustically isolated from said hub portion by said joining member.

6. The anvil defined in claim 5 wherein the peripheral portion is tapered to present an annular peripheral edge having a small surface area.

7. The anvil defined in claim 5 wherein said annular peripheral portion is made of a metal having relatively good sound transmissivity and said joining member is made of an elastomer.

References Cited by the Examiner

UNITED STATES PATENTS

| | | | |
|---|---|---|---|
| 2,410,834 | 11/1946 | Messmer | 53—373 X |
| 2,946,120 | 7/1960 | Jones et al. | 29—470 |
| 3,222,239 | 12/1965 | Deans | 156—380 |
| 3,224,915 | 12/1965 | Balamuth et al. | 156—73 |

FOREIGN PATENTS

| | | |
|---|---|---|
| 1,264,171 | 5/1961 | France. |

EARL M. BERGERT, *Primary Examiner.*

P. DIER, *Assistant Examiner.*